US007580866B2

United States Patent
Church

(10) Patent No.: US 7,580,866 B2
(45) Date of Patent: Aug. 25, 2009

(54) APPARATUS, METHODS, AND COMPUTER READABLE MEDIUM FOR DETERMINING THE LOCATION OF A PORTABLE DEVICE IN A SHOPPING ENVIRONMENT

(75) Inventor: Craig D. Church, Pearl, MS (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1059 days.

(21) Appl. No.: 10/774,372

(22) Filed: Feb. 10, 2004

(65) Prior Publication Data

US 2005/0177445 A1 Aug. 11, 2005

(51) Int. Cl.
G06Q 30/00 (2006.01)
G06F 17/30 (2006.01)
(52) U.S. Cl. .............................. 705/26; 705/1; 705/27
(58) Field of Classification Search ................. 705/1, 705/14, 26–27; 455/414
See application file for complete search history.

(56) References Cited

U.S. PATENT DOCUMENTS

| | | | | |
|---|---|---|---|---|
| 5,938,721 A * | 8/1999 | Dussell et al. | ............... | 701/211 |
| 6,317,718 B1 * | 11/2001 | Fano | ............... | 705/1 |
| 6,386,450 B1 * | 5/2002 | Ogasawara | ............... | 235/383 |
| 6,937,998 B1 * | 8/2005 | Swartz et al. | ............... | 705/26 |
| 2001/0034664 A1 * | 10/2001 | Brunson | ............... | 705/26 |
| 2002/0138372 A1 * | 9/2002 | Ludtke | ............... | 705/27 |
| 2002/0174021 A1 * | 11/2002 | Chu et al. | ............... | 705/26 |
| 2002/0194081 A1 * | 12/2002 | Perkowski | ............... | 705/26 |
| 2003/0027555 A1 * | 2/2003 | Malackowski et al. | ............... | 455/414 |
| 2004/0215524 A1 * | 10/2004 | Parkyn | ............... | 705/26 |

OTHER PUBLICATIONS

"Data Bases—Becoming more popular in retail stores and malls are kiosks, which provide customers with an alternative for getting products, information, and services from stores". BrandMarketing Supplement to Supermarket News , v V , n 7 , p. 26+, Jul. 1998. [recovered from Dialog on Apr. 7, 2009].*

* cited by examiner

Primary Examiner—Jeffrey A. Smith
Assistant Examiner—William J Allen

(57) ABSTRACT

A method, a system and a device for locating items are provided. The device sends a selection of at least one item to the server. The server receives the selection and accesses location information regarding the at least one item. The server sends the location information to the device, which outputs the location information. In some implementations, a user may indicate a desire to receive the location information via e-mail at an e-mail address indicated by the user. In other implementations the user may select the at least one item by using a touch screen, by saying a name of the at least one item, or by writing the name of the item on a display.

26 Claims, 8 Drawing Sheets

100

APPARATUS, METHODS, AND COMPUTER READABLE MEDIUM FOR DETERMINING THE LOCATION OF A PORTABLE DEVICE IN A SHOPPING ENVIRONMENT

TECHNICAL FIELD

The invention pertains to data communications. In particular, the invention relates to obtaining, from a device, location information regarding items within a particular site.

BACKGROUND OF THE INVENTION

Other than referring to a store directory (if one exists) or finding a store sales clerk or a knowledgeable shopper, there is currently nothing available to help shoppers locate items in a store. Thus, many shoppers may search all over a store to locate one or more items, or may wait in a long line at a service counter to ask where particular items are located. This is a particularly difficult problem for handicapped shoppers who use motorized chairs. Such a shopper must press a button, or the like, in order to control movement of the chair. While searching for the location of store items, these shoppers may experience discomfort or fatigue from controlling the motorized chair. Further, shoppers who are hearing impaired may not be able to easily communicate with store employees and may not be able to effectively ask where an item is located. A quick and easy way to locate items in stores is needed to make shopping trips shorter and more productive.

SUMMARY OF THE INVENTION

A method and a system are provided for requesting and receiving, via a device, location information pertaining to one or more items.

In a first aspect of the invention, a method is provided. In the method, a session is established between a device and a server. The device sends a selection of at least one item to the server. The server receives the selection and accesses location information regarding the at least one item. The server sends the location information to the device, which receives the location information from the server and outputs the location information.

In a second aspect of the invention, a device is provided. The device includes processing logic, an input device coupled to the processing logic, a display coupled to the processing logic, and a wireless communication interface coupled to the processing logic. The processing logic is configured to receive a selection of at least one item from a user via the input device, send the selection of the at least one item to a server via the wireless communication interface, receive, via the wireless communication interface, location information regarding the at least one item from the server, and output the location information on the display.

In a third aspect of the invention, a system for requesting and receiving item location is provided. The system includes a server. The server includes first processing logic, a communication interface connected to the first processing logic and configured to communicate via one of a wireless connection and a wired connection. The first processing logic is configured to establish communications with a device, receive an indication of the at least one item via the communication interface, access location information regarding the at least one item, and send the location information to the device via the communication interface.

In a fourth aspect of the invention, a device is provided. The device includes means for inputting information representing at least one item, means for sending and receiving messages wirelessly, wherein at least some of the messages are destined for a server and the means for sending and receiving is configured to send the information representing the at least one item to the server. The device further includes means for receiving item location information, pertaining to the at least one item, from the server and means for displaying the item location information.

In a fifth aspect of the invention, a machine-readable medium is provided the machine-readable medium has recorded therein, instructions for at least one processor, wherein when the at least one processor executes the instructions, the at least one processor is configured to: establish communication with a server; send a selection of at least one item to the server; receive location information, regarding the at least one item, from the server; and output the location information.

In a sixth aspect of the invention, a machine-readable medium is provided the machine-readable medium has recorded therein, instructions for at least one processor, wherein when the at least one processor executes the instructions, the at least one processor is configured to: establish communications with a device; receive a selection of at least one item from the device; access location information regarding the at least one item; and send the location information to the device.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Exemplary System

Figure 1:
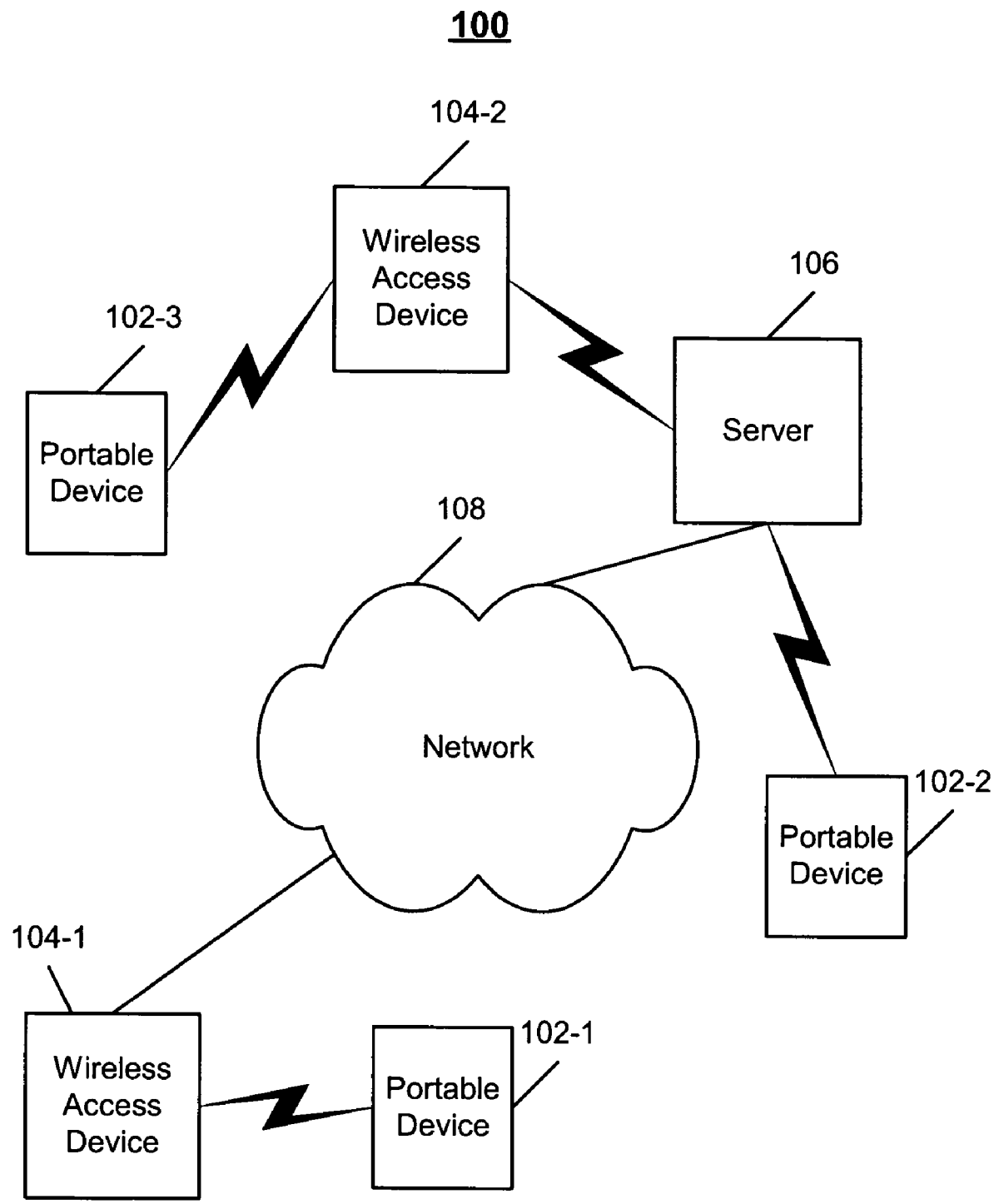
FIG. 1 depicts an exemplary system consistent with principles of the invention.

FIG. 1 depicts an exemplary system 100 for locating items at a particular location or site, such as, for example, a store. System 100 may include one or more portable devices 102-1-102-3, one or more wireless access devices 104-1-104-2, one or more servers 106 and a network 108.

Portable devices 102 may be, for example, handheld portable devices for requesting and receiving location information pertaining to items at a particular location or site, such as a store. Portable devices 102 could be, for example, a conventional portable device like a Blackberry, PDA, cell phone, pager, personal communicator, etc. Portable device 102 may communicate wirelessly or optically via a wireless connection. When communicating via the wireless connection, portable device 102 may use well-known wireless communication protocols, such as, for example, Wireless Fidelity (WiFi), Bluetooth, or the like. Each portable device 102 may communicate via a wireless connection with a wireless access device 104. In exemplary system 100, portable devices 102-1 and 102-3 communicate wirelessly with wireless access devices 104-1 and 104-2. Each portable device 102 may also communicate via a wireless connection directly with server 106, as shown by portable device 102-2 communicating with server 106 in system 100.

Each wireless access device 104 may include, for example, a radio tower or a router, such as a wireless router. Each wireless access device 104 may communicate with server 106 wirelessly, as, for example, wireless access device 104-2 of FIG. 1 does, or a wireless access device 104 may communicate with server 106 via a network, such as network 108, as, for example, wireless access device 104-1 of FIG. 1 does.

Network 108 may include a local area network (LAN), a wide area network (WAN), an intranet, the Internet, a combination of networks or the like. Thus, server 106 may be located relatively near portable devices 102 or at a remote location.

Figure 2:
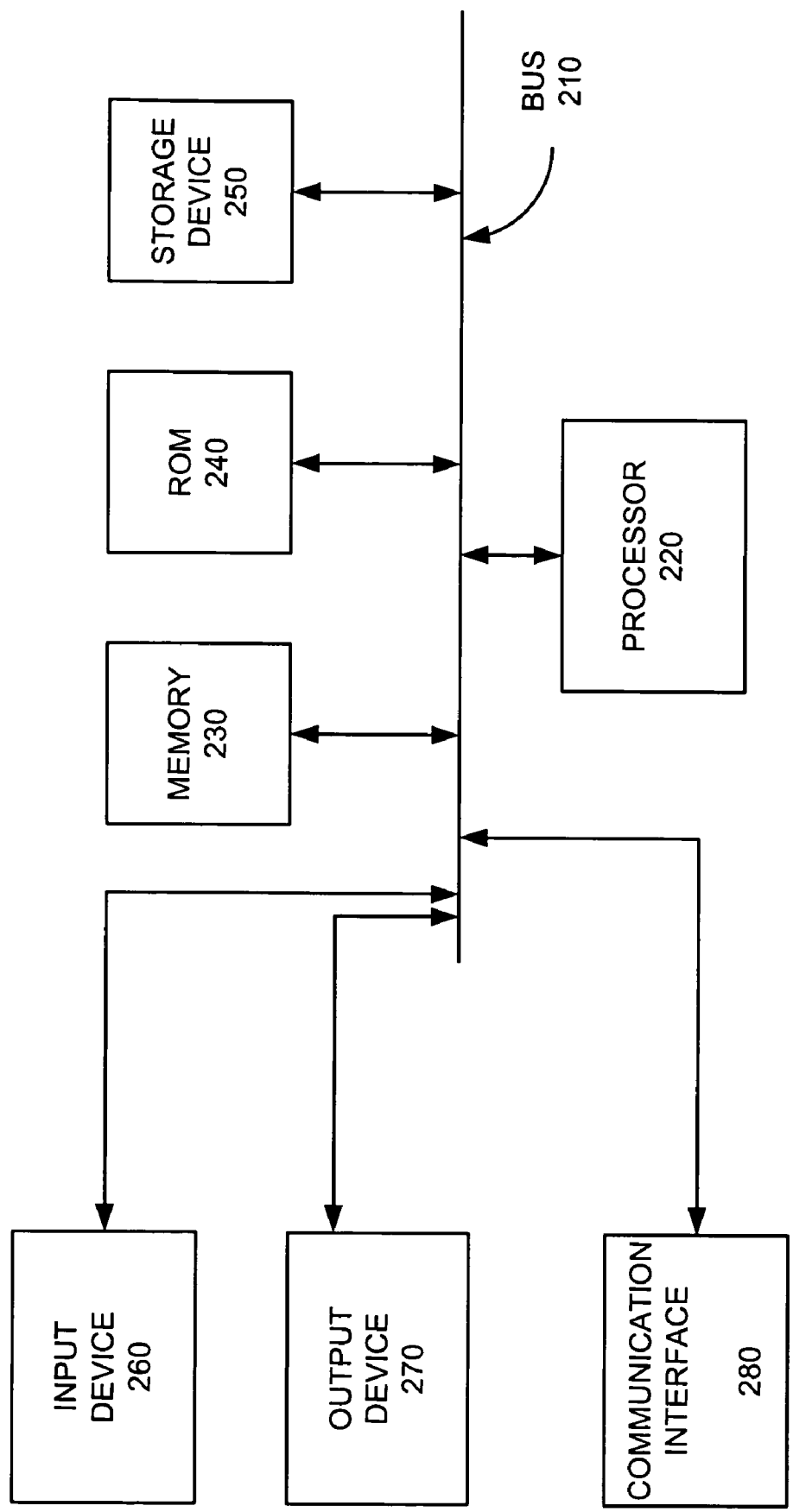
FIG. 2 illustrates a system that may be used to implement a portable device and a server of FIG. 1.

FIG. 2 illustrates an exemplary diagram of a portable device 102, consistent with the present invention. Server 106 may be implemented in a similar manner, consistent with the present invention. Portable device 102/server 106 may include a bus 210, a processor 220, a memory 230, a read only memory (ROM) 240, a storage device 250, an input device 260, an output device 270, and a communication interface 280. Bus 210 permits communication among the components of portable device 102/server 106.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include non-volatile random access memory (NVRAM) or any type of magnetic or optical recording medium and its corresponding drive, such as a magnetic disk or optical disk and its corresponding disk drive.

Input device 260 may include one or more conventional mechanisms that permit a user to input information to system 100, such a keyboard, a touch screen, a mouse, a pen, a biometric mechanism, such as a voice recognition device, etc. Output device 270 may include one or more conventional mechanisms that output information to the user, including a display, a printer, one or more speakers, etc. Communication interface 280 may include any transceiver-like mechanism that enables portable device 102/server 106 to communicate via a network. For example, communication interface 280 may include a modem or an Ethernet interface for communicating via a local area network (LAN). Alternatively, communication interface 280 may include a wireless interface for communicating wirelessly.

Portable device 102/server 106 may perform functions in response to processor 220 executing sequences of instructions contained in a computer-readable medium, such as memory 230. A computer-readable medium may include one or more memory devices and/or carrier waves. Such instructions may be read into memory 230 from another computer-readable medium, such as storage device 250, or from a separate device via communication interface 280.

Execution of the sequences of instructions contained in memory 230 may cause processor 220 to perform certain acts that will be described hereafter. In alternative implementations, hard-wired circuitry may be used in place of or in combination with software instructions to implement the present invention. In still other implementations, various acts may be performed manually, without the use of portable device 102/server 106. Thus, implementations consistent with the invention are not limited to any specific combination of hardware circuitry and software.

Exemplary Operation

Figure 3:
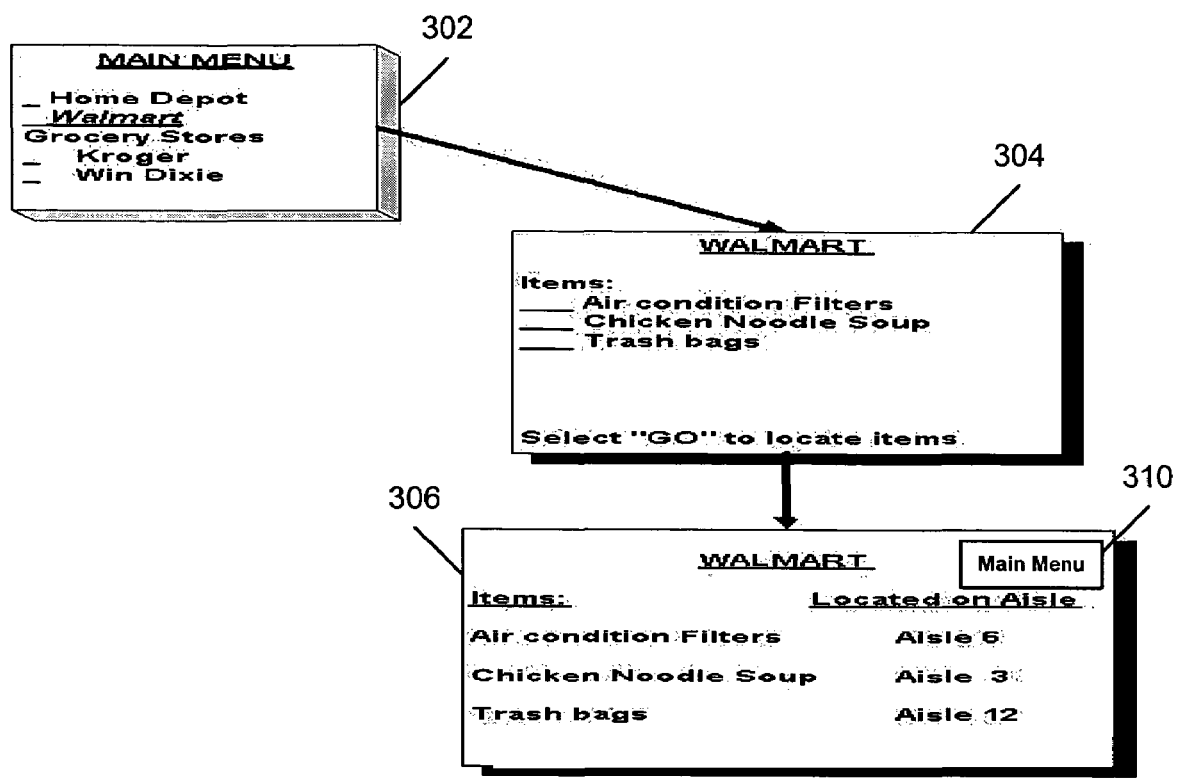
FIG. 3 illustrates an exemplary operation of an implementation consistent with the principles of the invention.

FIG. 3 illustrates an exemplary operation consistent with principles of the invention. In one implementation, after portable device 102 powers up, portable device 102 may display a main menu, such as main menu 302, on an output device 270, which may be, for example, a display screen. Portable device 102 may display main menu 302 after contacting server 106. Main menu 302 may include a listing of sites, such as, for example, stores in a user's area. The user may select one of the stores via input device 260. There are a number of different ways in which the user may select the desired store. For example, the user may make a selection via a touch screen by touching the touch screen display in an area where a representation of a desired store, for example, a name of the desired store, is displayed. The user may touch the display screen with, for example, an electronic pen, a stylus, or a finger. Alternatively, the user may select the store by using buttons on portable device 102 to move a cursor on the display screen of portable device 102 to the desired store representation and then by, for example, pressing a button, such as a "Go" button to register the selection with server 106.

After the user selects the store, using portable device 102, server 106 may send information to portable device 102 regarding, for example, items that the user may be interested in locating within the store. An exemplary store menu 304 that may be displayed on a display of portable device 102 is shown in FIG. 3. In the example of FIG. 3, the user selected Walmart in main menu 302, as may be indicated by the selected store name being displayed in main menu 302 after the selection. Exemplary store menu 304 may display the information from server 106 as a number of items that the user may select from the selected store. The items may appear in a particular order, such as, for example, alphabetical order (as shown in FIG. 3), or by category, such as baked goods, beauty supplies, seasonal items, etc (not shown). The user may scroll through the items by, for example, pressing a button of portable device 102 to advance a page or to view a previous page. Alternatively, the user may press a cursor control, such as a button, to advance or reverse the display by one or more lines at a time. Further, a scroll bar (not shown) may appear on the screen to allow the user to touch and drag the scroll bar on a touch screen, using, for example, a pen, a stylus, or a finger, to advance or reverse the display. The user may select one or more displayed items in the same manner as described previously, regarding making selections from main menu 302. The user may indicate that selections are complete by, for example, pressing a button, such as a Go button.

After receiving an indication of selected items, server 106 may access a database for the selected store to determine where the items are located. Server 106 may then prepare a message, including locations of the selected items, and may send the message to portable device 102. Exemplary item display 306 shows three items being displayed, (1) air conditioner filters, located in aisle 6; (2) chicken noodle soup, located in aisle 3; and (3) trash bags, located in aisle 12.

In some implementations, the user may again access main menu display 302 from other displays, such as, for example, item display 306 by, for example, pressing or by selecting main menu icon 310 that may appear on the display of portable device 102.

Figure 4:
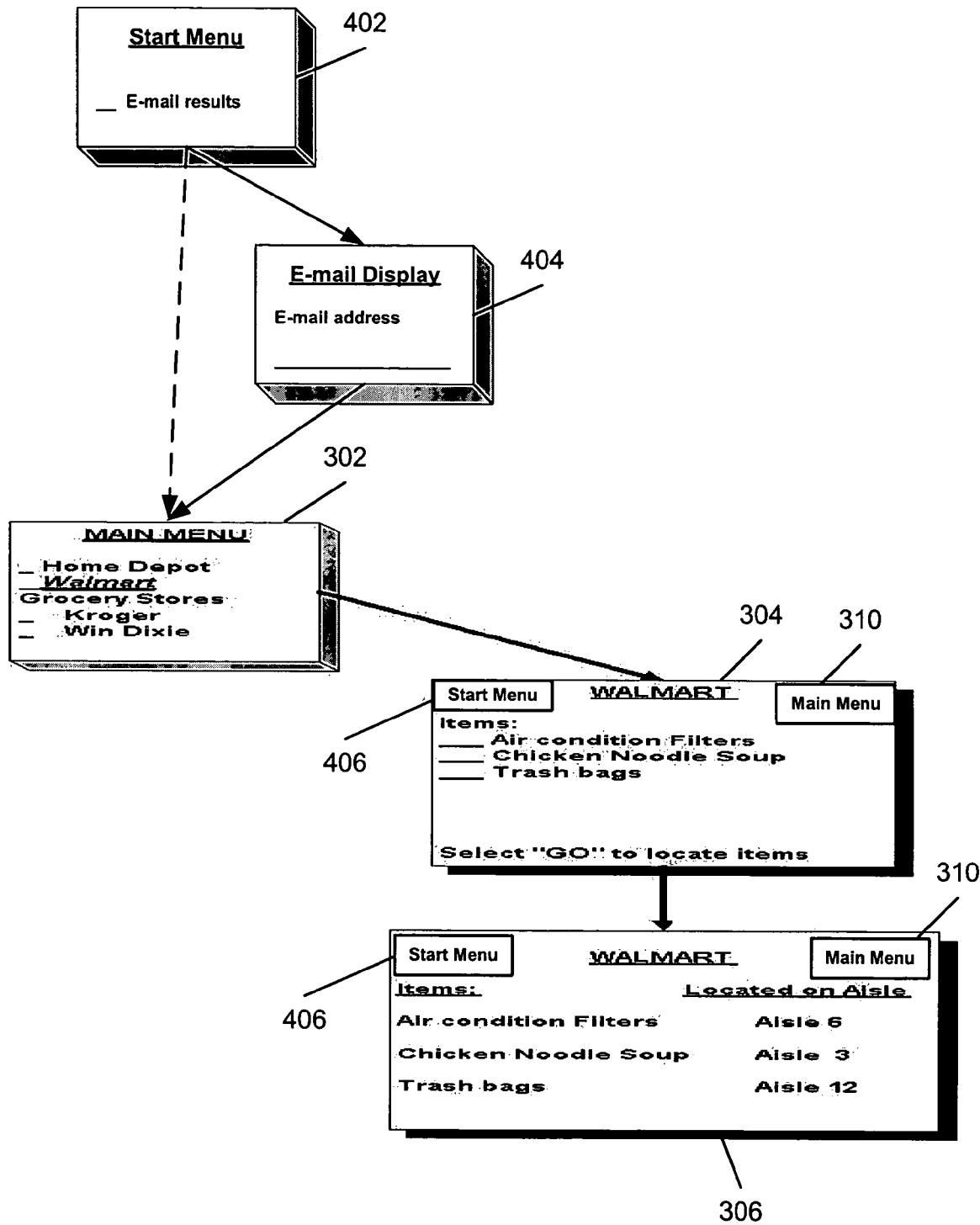
FIG. 4 illustrates another exemplary operation of another implementation consistent with the principles of the invention.

FIG. 4 illustrates an alternative implementation consistent with the principles of the invention. In this implementation, portable device 102 may display a start menu after powering up, such as a start menu 402, which provides the user with an option of having results e-mailed. The user may select "E-mail results" from displayed start menu 402. If the user selects "E-mail results," the user may be prompted by an e-mail display 404 to enter an e-mail address indicating where the results are to be e-mailed. The user may enter the e-mail address in a number of different ways. For example, the user may enter the address via, for example, a keyboard, which may be part of portable device 102, or the user may request a keyboard display on portable device 102 by, for example, pressing a button or touching a particular area of the display with an electronic pen, a stylus, or a finger. The user may then select each character by using, for example, cursor keys to move a cursor to a desired character and, for example, pressing a button to indicate that the cursor is placed over the desired character. Further, the user may enter characters by, for example, touching the desired characters on a touch screen of portable device 102 with, for example, an electronic pen, a stylus, or a finger.

After entering the e-mail address, portable device 102 may display main menu 302, store menu 304 and item display 306, as previously described. If the user indicated that e-mail results are desired, then item display 306 may not be displayed on portable device 102. Instead, information regarding the selected items may be e-mailed to the e-mail address entered by the user. If the user did not indicate that e-mail results are desired, then results, such as exemplary item display 306, may be displayed on, for example, a display screen of portable device 102. Store menu 304 and/or item display 306 may include a start menu icon 406 and/or a main menu icon 310. When the user selects start menu icon 406, portable device 102 may display a start menu, such as start menu 402. When the user selects main menu icon 310, portable device 102 may display a main menu, such as main menu 302.

Exemplary Processing

Figure 5A:
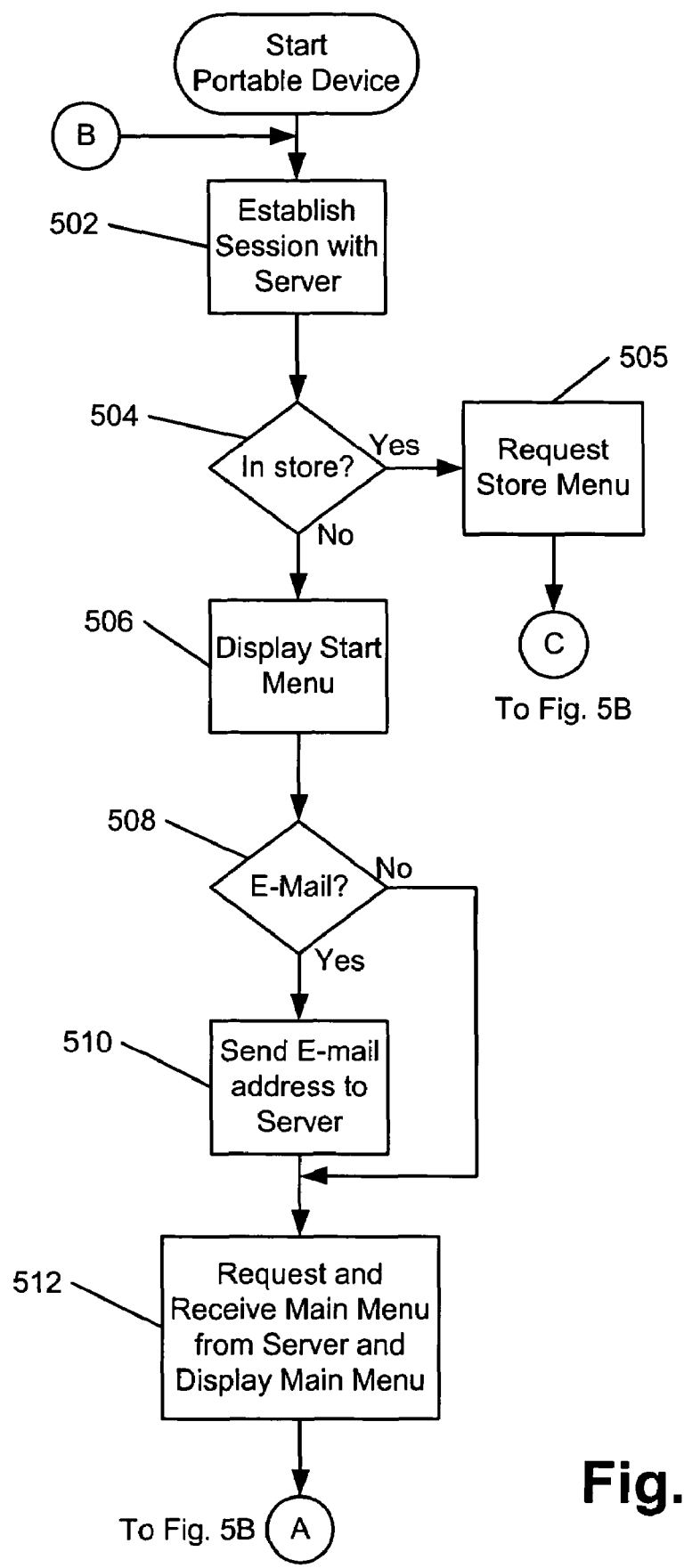
FIGS. 5A-5B are flowcharts that illustrate exemplary processing by the portable device of FIG. 1, consistent with the principles of the invention.
Figure 5B:
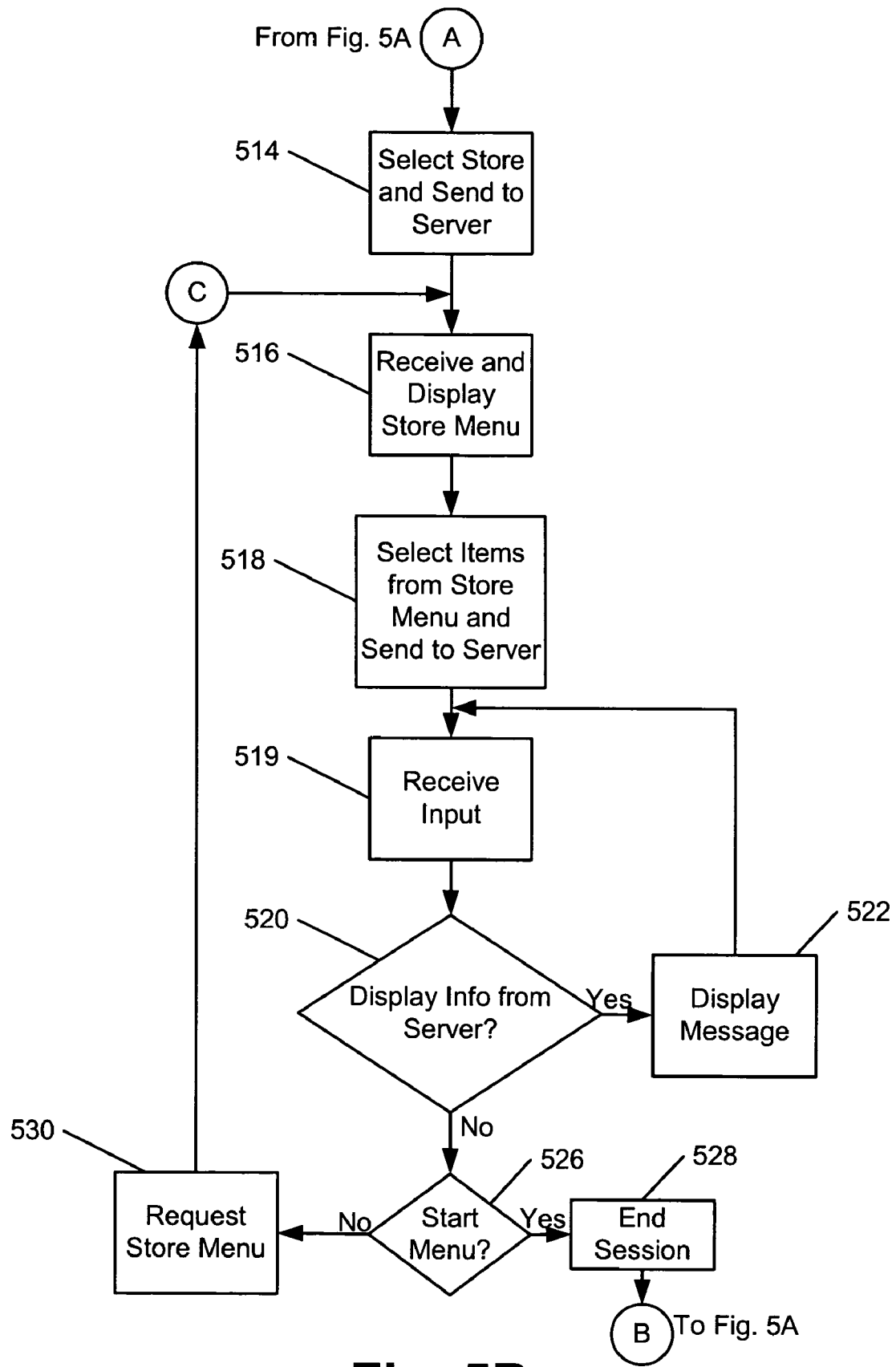

FIGS. 5A-5B illustrate exemplary processing logic that may be performed by portable device 102 consistent with principles of the invention. Processing begins with portable device 102 attempting to establish a session with server 106 (act 502). Session establishment may occur in a number of ways. For example, portable device 102: (1) may contact server 106 directly via a wireless connection; (2) may contact server 106 via wireless access device 104, which then contacts server 106 via a wireless connection, or (3) may contact server 106 via wireless access device 104 connected to network 108, to which server 106 is connected.

Portable device 102 may then determine whether portable device 102 is inside a store (act 504). When portable device 102 establishes a connection to server 106 via wireless access device 104, wireless access device 104 may include an identifier of the wireless access device 104 in a message or a header of the message sent to server 106 to establish a session from portable device 102. Server 106 may determine from the included identifier whether portable device 102 is located within a store. Server 106 may also determine when portable device 102 is contacting server 106 directly by, for example, examining header information that may be included with a message sent by portable device 102 to server 106, such as a session establishment message. When server 106 determines that portable device 102 is contacting server 106 directly, if server 106 is located within a store, then server 106 may assume that portable device 102 is also within the store. Server 106 may then send a message to portable device 102 indicating whether portable device 102 is inside a store.

If portable device 102 determines that it is inside a store, then portable device 102 may send a message to server 106 requesting a store menu (act 505). Otherwise, portable device 102 may display a start menu, such as exemplary start menu 402 on output device 270, which may be, for example, a display screen (act 506). At this point a user may indicate a desire for results to be e-mailed and may enter an e-mail address via, for example, e-mail display 404. Portable device 102 may then determine whether the user desires e-mailed results and whether an e-mail address was entered (act 508). If the user indicated that e-mailed results are desired and the user entered an e-mail address, then portable device 102 may send the e-mail address in a message to server 106 (act 510). If e-mailed results are not selected, processing continues as described below.

Portable device 102 may then send a main menu request to server 106 and subsequently, may receive and display on output device 270, a main menu, such as main menu 302 (act 512). The user may then select a site, such as, for example, a store from the displayed main menu, such as main menu 302, and portable device 102 may send the store selection to server 106 (act 514). Portable device 102 may then receive and display, on output device 270, a store menu, such as store menu 304 (act 516). The user may then select one or more items from the displayed store menu and, upon completing the selection of store items, portable device 102 may send the selection of store items in a message to server 106 (act 518).

Portable device 102 then may wait to receive input, either from server 106 or from the user (act 519). After input is received, portable device 102 may determine whether the input was received from server 106 (act 520). If the input is from server 106, then portable device 102 may display information from server 106, such as an item display, for example, item display 306 on output device 270 (act 522). Processing may then return to act 519 to wait for additional input.

If the received input is not from server 106, then portable device may determine whether the received input is a start menu request (act 526). Portable device 102 may receive the start menu request, for example, as a result of the user selecting start menu icon 406. If portable device 102 receives the start menu request, then portable device 102 may end the session with the server 106 (act 528) and processing proceeds to act 502 to establish a new session with server 106.

If the user input is not a start menu request, then portable device 102 may assume that the user input is a store menu request and portable device 102 may send a store menu request to server 106. Portable device 102 processing may then proceed to act 516.

In other implementations, portable device 102 may display the same menus regardless of whether portable device 102 is located inside or outside a store, such as illustrated by exemplary displays of FIG. 3. For example, portable device 102 may display a main menu listing different stores whether portable device 102 is inside a store or not. Such implementations of portable device 102 may not perform acts 504-505. Further, in implementations that do not provide the user with an option to receive results via e-mail at, for example, a home computer, portable device 102 may not perform acts 506-510.

Exemplary Server Processing

Figure 6A:
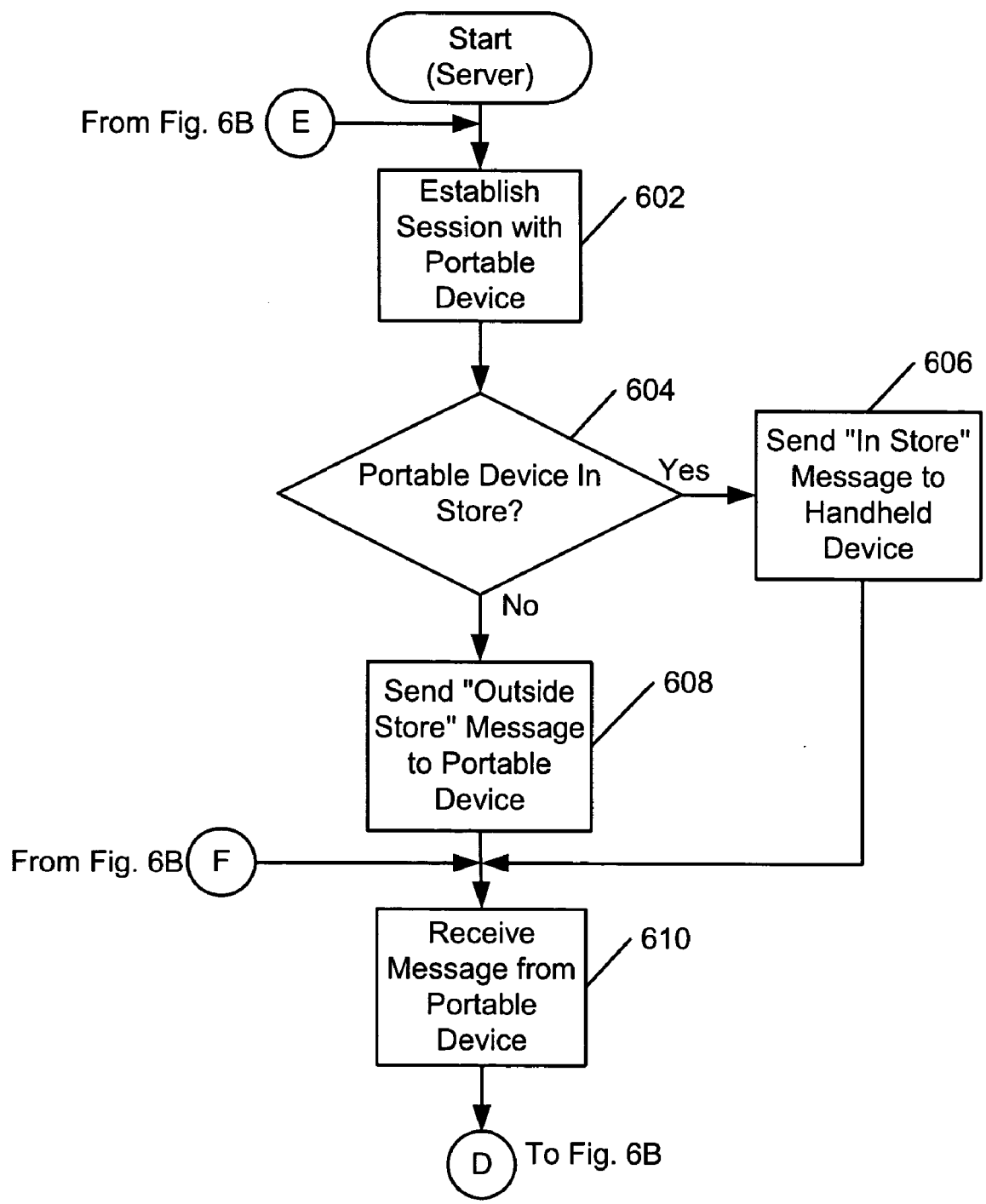
FIGS. 6A-6B are flowcharts that illustrate exemplary processing by the server of FIG. 1, consistent with the principles of the invention.
Figure 6B:
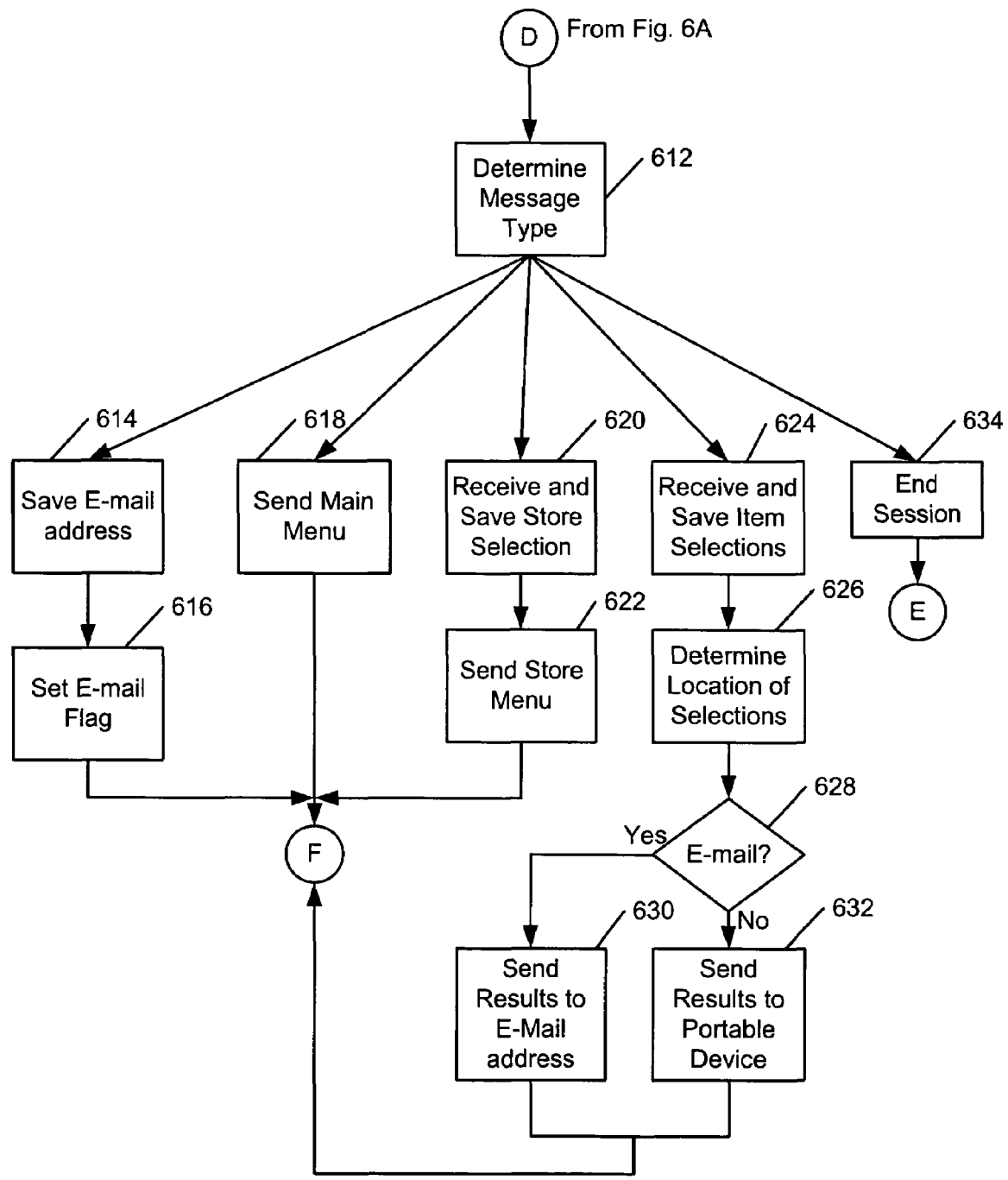

FIGS. 6A and 6B are flowcharts that illustrate exemplary processing logic by server 106 consistent with the principles of the invention. Processing begins with server 106 waiting to be contacted by portable device 102 and, when contacted, establishing a session with portable device 102 (act 602).

Next, server 106 may determine whether portable device 102 is located at a particular site, such as inside a store (act 604) by, for example, examining header information in a session establishment message originating from portable device 102 or, for example, by checking for an indicator that may be included in the session establishment message by wireless access device 104. The header information may include routing information that server 106 may use to determine whether portable device 102 is contacting server 106 directly or via wireless access device 104. If the message includes an identifier of wireless access device 104, as previously described, server 106 may determine whether portable device 102 is inside a store based on the wireless access device identifier.

If server 106 determines that portable device 102 is inside the store, then server 106 may send an "in store" message to portable device 102 (act 606). Otherwise, server 106 may send an "outside store" message to portable device 102 (act 608).

Server 106 may then wait to receive a message from portable device 102. When a message is received (act 610), server 106 may determine a type of message received (act 612). If the received message is a message indicating that portable device 102 desires to receive results via e-mail and the received message includes an e-mail address, then server 106 may save the e-mail address (act 614) and set an e-mail flag (act 616).

If the received message is a message for requesting a main menu, then server 106 may retrieve a list of stores in an area of portable device 102 (the area being determined by how portable device accesses server 106) and may send a main menu, including the list of stores, to portable device 102 (act 618).

If the received message is a response, from portable device 102, to a main menu display including a selected store, then server 106 may save the received store selection (act 620), access a database, create an item list for the selected store based on information from the database, and send the item list to portable device 102 for display on output device 270 (act 622).

If the received message is a selection of items from an item display on portable device 102, then server 106 may receive and save the item selections (act 624), may access a database for the particular store and may determine locations of the selected items in the store from the database (act 626). Server 106 may then check the e-mail flag to determine whether the user desires results to be e-mailed to a particular e-mail address (act 628). If the user indicated that results are to be e-mailed to a particular address, server 106 may e-mail the results to the particular address (act 630). If the user did not request results to be e-mailed to a particular address, then server 106 may send the results in a message to portable device 102 for display on output device 270 (act 632).

If the received message is an "end session" message from portable device 102, then server 106 may end the session and execute act 602 to wait for portable device 102 to attempt to establish another session.

The above exemplary processing is consistent with an implementation of server 106 that operates in a manner as described with respect to the exemplary operation of FIG. 4. In an implementation in which the user is not provided with an option to enter an e-mail address for e-mailed results, then acts 614, 616, 628 and 630 may not be performed.

Alternative Embodiments

The above implementations illustrate one portable device 102 interacting with server 106 at one time. The implementations were presented in this manner to simplify the description of implementations of the invention. In fact, many portable devices 102 may communicate with server 106 at one time. Further, system 100 may include more than one server 106. For example, there may be a server for each store. In other implementations consistent with the principles of the invention, there may be only one centrally located server.

The above implementations describe certain types of messages being communicated between server 106 and portable device 102. In other implementations, communications between server 106 and portable device 102 may be in a series of e-mail messages. Thus, server 106 may send information to portable device 102 via an e-mail message for portable device 102 to display on output device 270. Similarly, portable device 102 may send site or item selection information to server 106 via e-mail messages.

In addition, the above processing has been described with respect to a portable device 102 requesting information from server 106. In other implementations, a user, via a conventional personal computer (PC), laptop, PDA, etc. may access server 106 from the user's home (or other location) to obtain the desired information, prior to actually going to the store. Further, in other implementations, a stationary device may be used instead of portable devices 102. For example, a centrally located terminal device may be set up in front of a store. Customers may interact with this terminal device in a similar manner as portable device 102 to obtain locations of various items in the store.

Further, in the above-described implementations, a user may select items from a displayed list. In other implementations, a user may either select items from the displayed menu on portable device 102 or may enter, on portable device 102, a name of an item, such as, for example, "ketchup." The user may enter the name of the item by using a keyboard or by using a keypad similar to a telephone keypad in which some buttons may represent multiple characters, wherein the user may select one of the characters by pressing a keypad button a certain number of times. Alternatively, the user may cause a keyboard to be displayed on output device 270 and the user may then select characters from the displayed keypad by touching the displayed keypad via an electronic pen, a stylus, or a finger. In other implementations, the user may write the characters on a surface of a touch screen display with an electronic pen, a stylus or a finger. Portable device 102 may also include, for example, character recognition software in order to recognize characters written by the user on the touch screen display. Portable device 102 may then display each of the recognized characters. In some implementations, portable device 102 may include, for example, speech recognition software or hardware and a microphone for user input.

Further, certain portions of the invention have been described as "logic" that performs one or more functions.

This logic may include hardware, such as an application specific integrated circuit or a field programmable gate array, software being executed by a processor or microprocessor, or a combination of hardware and software.

Conclusion

The foregoing description of the preferred embodiments of the present invention are provided for illustration and description, but is not intended to be limiting or to limit the invention to the precise form disclosed. Modifications and variations are possible in light of the above teachings or may be acquired from practice of the invention. For example, while series of acts have been described with regard to FIGS. 5A-6B, the order of the acts may differ in other implementations consistent with the present invention. Also, non-dependent acts may be performed in parallel.

No element, act or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
    determining whether a portable device is or is not located within a first site;
    wherein when the portable device is located within the first site:
        sending a menu of items located at the first site to the portable device for displaying to a user,
        receiving, from the portable device, a selection by the user of at least one item from the menu of items located at the first site, and
        sending location information regarding the at least one item selected from the menu of items at the first site to the portable device for displaying to the user; and
    wherein when the portable device is not located within the first site:
        sending to the portable device a menu of sites located within a vicinity of the portable device for displaying to the user, and
        receiving from the portable device a selection of a second site from the menu of sites by the user.

2. The method of claim 1, further comprising establishing a connection between the portable device and a server via a wireless connection or an optical connection.

3. The method of claims 1, wherein the first site includes a store and the second site includes a store.

4. The method of claim 1, wherein when the portable device is not located within the first site, the method further includes:
    sending to the portable device a menu of items located at the second site for displaying to the user;
    receiving, from the portable device, a selection by the user of at least one item from the menu of items at the second site; and
    sending location information regarding the at least one item selected from the menu of items at the second site to the portable device for displaying to the user.

5. The method of claim 4, further comprising:
    sending the location information to the portable device via e-mail.

6. The method of claim 4, wherein the location information includes a location of each of the at least one selected item from the menu of items from the first site or the second site.

7. A portable device comprising:
    processing logic;
    an input device coupled to the processing logic;
    a display coupled to the processing logic; and
    a wireless communication interface coupled to the processing logic, wherein the processing logic:
    determines whether the portable device is or is not located within a first site;
    wherein when the portable device is located within the first site, the portable device:
        receives a menu of items located at the first site for displaying to a user on the display,
        receives a selection by the user of at least one item from the menu of items located at the first site and sends the selection of the at least one item from the menu of items located at the first site to a server, and
        receives location information regarding the at least one item selected from the menu of items at the first site from the server for displaying on the display; and
    wherein when the portable device is not located within the first site, the portable device:
        receives a menu of sites located within a vicinity of the portable device for outputting to the display, and
        receives a selection by the user of a second site from the menu of sites and sends to the server the selection of the second site.

8. The device of claim 7, wherein the processing logic receives location information via e-mail.

9. The device of claim 7, wherein, when the portable device is not located within the first site, the processing logic:
    receives a menu of items located at the second site for outputting to the display;
    receives a selection of at least one item from the menu of items at the second site and sends to the server the selection of the at least one item from the menu of items at the second site; and
    receives location information regarding the at least one item selected from the menu of items at the second site from the server for displaying on the display.

10. The device of claim 9, wherein the input device includes a touch screen, and wherein the processing logic receives the selection of the at least one item from the touch screen with one of an electronic pen, a stylus, or a finger in an area where a representation of each of the at least one item is displayed on the display.

11. The device of claim 9, wherein the input device includes a touch screen, wherein the processing logic receives the selection of the at least one item when the user writes a name of the at least one item on the touch screen with one of an electronic pen, a stylus, or a finger.

12. The device of claim 9, wherein the input device includes means for recognizing speech, wherein the processing logic receives the selection of the at least one item when the user says a name of the at least one item.

13. The device of claim 9, wherein the processing logic sends the selection of the at least one item to the server via an e-mail message.

14. The device of claim 9, wherein the processing logic receives the location information from the server via an e-mail message.

15. A system comprising:
    a server including:
        first processing logic, and
        a communication interface connected to the first processing logic to communicate via one of a wireless connection or a wired connection, the first processing logic:

determines whether a portable device is or is not located within a first site;

wherein when the portable device is located within the first site, the first processing logic:

sends a menu of items located at the first site to the portable device for displaying to a user, receives, from the portable device, a selection by the user of at least one item from the menu of items located at the first site, sends the location information regarding the at least one item from the menu of items at the first site to the portable device for display to the user; and wherein when the portable device is not located within the first site, the processing logic:

sends to the portable device a menu of sites located within a vicinity of the portable device for displaying to the user, and receives, from the portable device, a selection of a second site from the menu of sites by the user.

16. The system of claim 15, wherein the portable device comprises:

second processing logic, an input device connected to the second processing logic, a display connected to the second processing logic, and a wireless communication interface connected to the second processing logic, wherein the second processing logic:

receives the selection of the at least one item from the user via the input device, sends the selection of the at least one item to the server, receives the location information regarding the at least one item from the server, and displays the location information on the display.

17. The system of claim 16, wherein the second processing logic further:

displays at least one menu when the second processing logic determines that the device is not located at the first site, and refrains from displaying the at least one menu when the second processing logic determines that the device is located at the first site.

18. The system of claim 16, wherein the input device comprises a touch screen, wherein the second processing logic receives the selection of the at least one item when the user touches the touch screen with one of an electronic pen, a stylus or a finger in an area where a representation of the at least one item is displayed on the display.

19. The system of claim 16, wherein the input device comprises at least one of means for recognizing speech or means for recognizing a character written on a surface of the display of the device.

20. The system of claim 15, wherein the first processing logic sends an indication to the portable device indicating whether the portable device is located at a first site.

21. The system of claim 15, wherein when the portable device is not located within the first site, the first processing logic:

sends to the portable device a menu of items located at the second site for displaying to the user;

receives, from the portable device, a selection by the user of at least one item from the menu of items at the second site; and sends location information regarding the at least one item from the menu of items at the second site to the portable device for display to the user.

22. A tangible computer-readable medium having a plurality of instructions for at least one processor, wherein when the instructions are executed by the at least one processor, the at least one processor performs the method comprising:

determining whether a portable device is or is not located within a first site;

wherein when the portable device is located within the first site:

sending a menu of items located at the first site to the portable device for displaying to a user, receiving, from the portable device, a selection by the user of at least one item from the menu of items located at the first site, and sending location information regarding the at least one item selected from the menu of items at the first site to the portable device for displaying to the user; and wherein when the portable device is not located within the first site:

sending to the portable device a menu of sites located within a vicinity of the portable device for displaying to the user, and receiving from the portable device a selection of a second site by the user.

23. The tangible computer-readable medium of claim 22, wherein when the portable device is not located within the first site, the method further comprises:

sending to the portable device a menu of items located at the second site for displaying to the user;

receiving, from the portable device, a selection by the user of at least one item from the menu of items at the second site; and sending location information regarding the at least one item selected from the menu of items at the second site to the portable device for displaying to the user.

24. The tangible computer-readable medium of claim 23, wherein the first site is a store and the second site is a store.

25. A method comprising:

determining whether a portable device is or is not located within a site;

sending to the portable device, when the portable device is determined to be located within the site, a menu of items located at the site for displaying to a user of the portable device; and sending to the portable device, when the portable device is determined not to be located within a site, a menu of sites located within a vicinity of the portable device for displaying to the user.

26. The method of claim 25, further comprising:

receiving, from the portable device, a selection by the user of at least one item from the menu of items located at the site, and sending location information regarding the at least one item selected from the menu of items at the site to the portable device for displaying to the user.

* * * * *